United States Patent
Hirano (10) Patent No.: US 7,777,554 B2
(45) Date of Patent: Aug. 17, 2010

(54) METHOD AND APPARATUS FOR DETECTING TEMPERATURES OF A PLURALITY OF CIRCUITS AND CONTROLLING OPERATIONS BASED ON THE DETECTED TEMPERATURES

(75) Inventor: Yasutoshi Hirano, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 491 days.

(21) Appl. No.: 11/825,429

(22) Filed: Jul. 6, 2007

(65) Prior Publication Data

US 2008/0049811 A1 Feb. 28, 2008

(30) Foreign Application Priority Data

Jul. 6, 2006 (JP) .............................. 2006-186280

(51) Int. Cl.
*H01L 35/00* (2006.01)
*H01L 37/00* (2006.01)
(52) U.S. Cl. ...................................... 327/512; 327/513
(58) Field of Classification Search ................ 327/512, 327/513; 331/49, 57, 66
See application file for complete search history.

(56) References Cited

U.S. PATENT DOCUMENTS 4,850,264 A * 7/1989 Kiser ......................... 454/255
7,260,007 B2 * 8/2007 Jain et al. .................... 365/212

FOREIGN PATENT DOCUMENTS

| JP | 6-196645 | 7/1994 |
|---|---|---|
| JP | 2003-46674 | 2/2003 |

* cited by examiner

Primary Examiner—David Mis
(74) Attorney, Agent, or Firm—Cooper & Dunham LLP (57) ABSTRACT

A temperature detector includes a plurality of temperature sensors each configured to generate a voltage signal in accordance with sensed temperature and output the voltage signal, a plurality of storage circuits corresponding to the respective temperature sensors and each configured to store a signal level input to the storage circuit and output the stored signal level in response to a control signal, and a control circuit configured to exclusively select one of the voltage signals output from the respective temperature sensors, compare the selected voltage signal with a predetermined reference voltage, and store the selected voltage signal into the corresponding storage circuit sequentially in response to the control signal.

18 Claims, 6 Drawing Sheets

METHOD AND APPARATUS FOR DETECTING TEMPERATURES OF A PLURALITY OF CIRCUITS AND CONTROLLING OPERATIONS BASED ON THE DETECTED TEMPERATURES

TECHNICAL FIELD

The present disclosure relates to a method and apparatus for detecting temperature, and more particularly to a method and apparatus for detecting temperature to control a plurality of circuits with small circuit.

BACKGROUND

Recently, semiconductor devices have come to include a plurality of power circuits on a chip. The power circuits respectively drive a variety of circuits, for example, a constant voltage circuit, a motor drive circuit, an illumination control circuit, and so on. The semiconductor device also includes power transistors which may generate heat due to a large current flow through the power transistor. A current limit circuit is generally used to reduce such heat generation by cutting off the current flow.

However, a temperature of the semiconductor device is also affected by an ambient temperature and a power consumption of the semiconductor device. When the ambient temperature is low or a voltage applied to the power transistor is low, more current than a current value being limited by the current limiter circuit may be allowed to flow with no problem. Conversely, when the ambient temperature is high, the temperature of the semiconductor device may easily exceed an acceptable maximum value before the current limit circuit starts to limit the current.

Thus, it is insufficient to protect the semiconductor device from overheating using only the current limiter circuit. Therefore, temperature sensing elements may be employed and provided near heat generating elements such as the power transistors in the semiconductor device. When the temperature sensing element detects a high temperature exceeding a predetermined temperature, the semiconductor device limits current flow through the power transistor to avoid overheating problem.

Recently, as electrical devices have become more advanced, more functions are provided with the electrical devices. For this reason, one chip semiconductor device that is an example of such electrical devices generally includes a plurality of power circuits on a chip. The electrical device needs to control power to the circuits by selectively switching the power circuits on/off such that power is not supplied to circuits that do not contribute a function. Furthermore, power is supplied to those circuits that contribute functions and power is always supplied to a control circuit that controls the whole system of the electrical device. Thus, controlling the power circuits in the electrical device has become more and more complicated.

In a conventional electrical device, a temperature sensor may be provided at each power circuit and the power supply circuit is stopped when the temperature of the power supply circuit increases and exceeds a predetermined value. Further, an importance rank table that describes conditions for power supply circuits at various cases may be prepared, such that, when the temperature sensor detects an abnormal temperature at one power circuit, the electrical device may output a plurality of power control signals based on the importance rank table to manage the whole system of the electrical device.

However, in the conventional electrical device, a large number of comparators equal in number to the number of temperature sensors, are needed to compare each output value of the temperature sensor with a reference voltage. As the number of the temperature sensors increases, a circuit size of the electrical device increases. Further, the circuit looses flexibility, when the circuit is adapted for a specific use by configuring so as to output a plurality of the power control signals based on the predetermined importance rank table.

BRIEF SUMMARY

This patent specification describes a novel temperature detector that includes a plurality of temperature sensors each configured to generate a voltage signal in accordance with a sensed temperature and output the voltage signal, a plurality of storage circuits corresponding to respective ones of the temperature sensors and configured to store a signal level input to the storage circuit and output the stored signal level in response to a control signal, and a control circuit configured to exclusively select one of the voltage signals output from the temperature sensors, compare the selected voltage signal with a predetermined reference voltage, and store the selected voltage signal into the corresponding storage circuit sequentially in response to the control signal.

This patent specification further describes a novel method for detecting temperature, which includes detecting temperature at a plurality of positions using a plurality of temperature sensors, generating a voltage signal in accordance with the temperature detected at the plurality of positions, outputting the voltage signal, selecting exclusively one of the voltage signals from among the several voltage signals, comparing the selected voltage signal with the predetermined reference voltage sequentially, and revising the comparison results sequentially on each sensor.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner.

Figure 1:
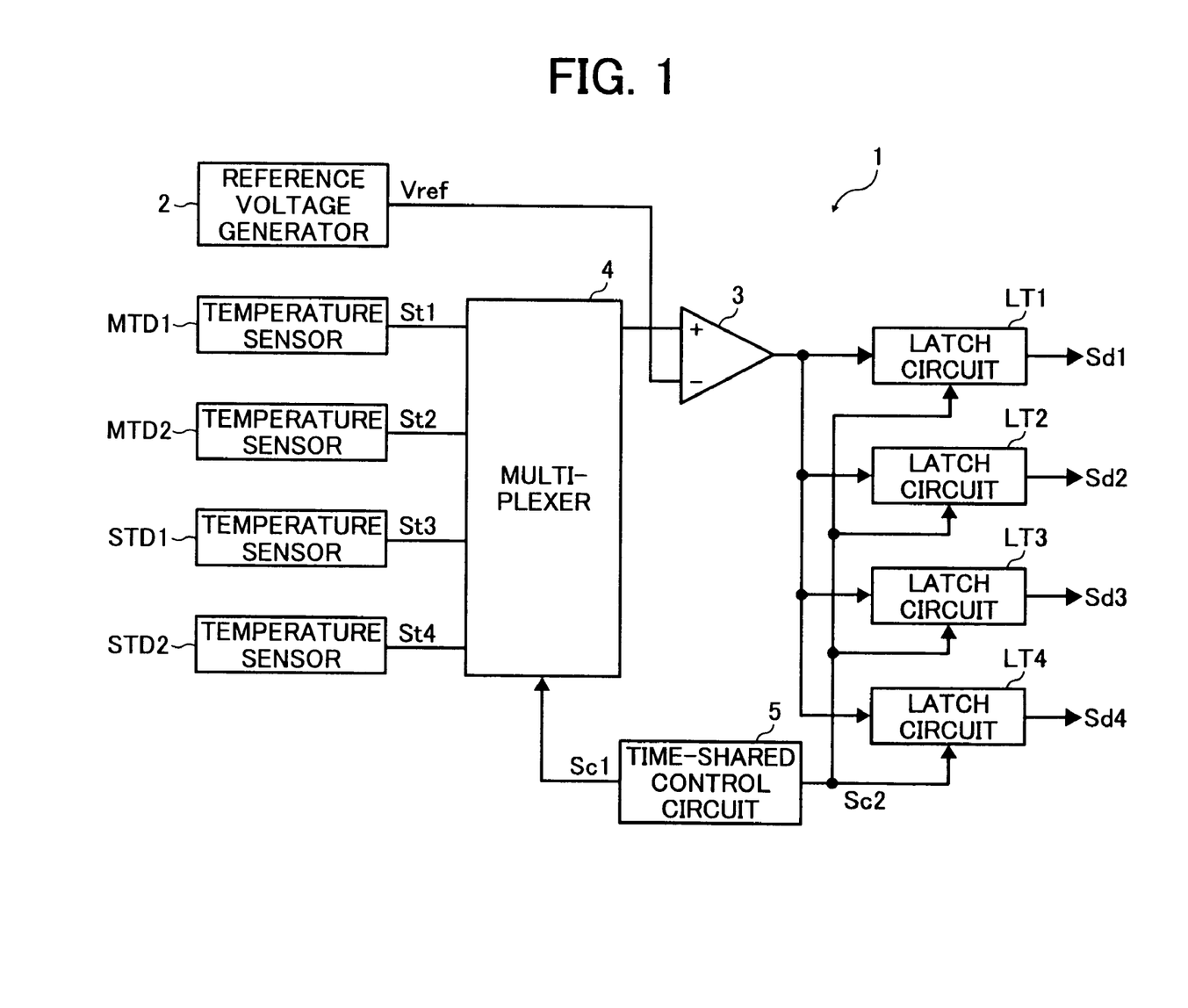
FIG. 1 is an illustration of an exemplary embodiment of a temperature detector.

Referring now to the drawings, wherein like reference numerals designate identical or corresponding parts throughout the several views, particularly to FIG. 1, a temperature detector according to exemplary embodiments is described.

FIG. 1 is an illustration of an exemplary embodiment of a temperature detector. The temperature detector includes temperature sensors MTD1, MTD2, STD1 and STD2, a reference voltage generator 2, a comparator 3, an analog multiplexer (multiplexer) 4, latch circuits LT1 through LT4, and a time-shared control circuit 5. The reference voltage generator 2 generates and outputs a predetermined reference voltage Vref. The temperature sensors MTD1, MTD2, STD1 and STD2 detect temperatures using an ordinary temperature characteristics of a PN junction voltage.

The temperature sensors MTD1, MTD2, STD1 and STD2 output voltage signals St1, St2, St3 and St4, respectively, in response to the detected temperatures. Each voltage signal St1, St2, St3 and St4 is input to the corresponding input of the multiplexer 4. The reference voltage Vref has no temperature dependence in this embodiment. The reference voltage generator 2 is formed of, for example, a band gap reference circuit.

An output terminal of the multiplexer 4 is connected to an input terminal of a non-inverted terminal of the comparator 3. The multiplexer 4 exclusively selects one of the voltage signals St1, St2, St3 and St4 and outputs the selected voltage signal to the non-inverted terminal of the comparator 3 in accordance with the control signal Sc1 input from the time-shared control circuit 5.

The reference voltage Vref is input to an inverted input of the comparator 3. The comparator 3 compares the voltage signal input from the multiplexer 4 with the reference voltage Vref and outputs a binary signal indicating a compared result. The binary signal is input to the latch circuits LT1 through LT4. The latch circuits LT1 through LT4 hold the binary signals respectively in accordance with a control signal Sc2 input from the time-shared control circuit 5. The latch circuits LT1 through LT4 output detection signals Sd1, Sd2, Sd3 and Sd4, respectively.

The reference voltage generator 2, the comparator 3, the multiplexer 4 and the time-shared control circuit 5 form a voltage comparing control circuit unit. The latch circuits LT1 through LT4 form storage circuit units respectively. The reference voltage generator 2 forms a reference voltage generation circuit unit. The time-shared control circuit 5 forms a time-shared control circuit unit.

Figure 2:
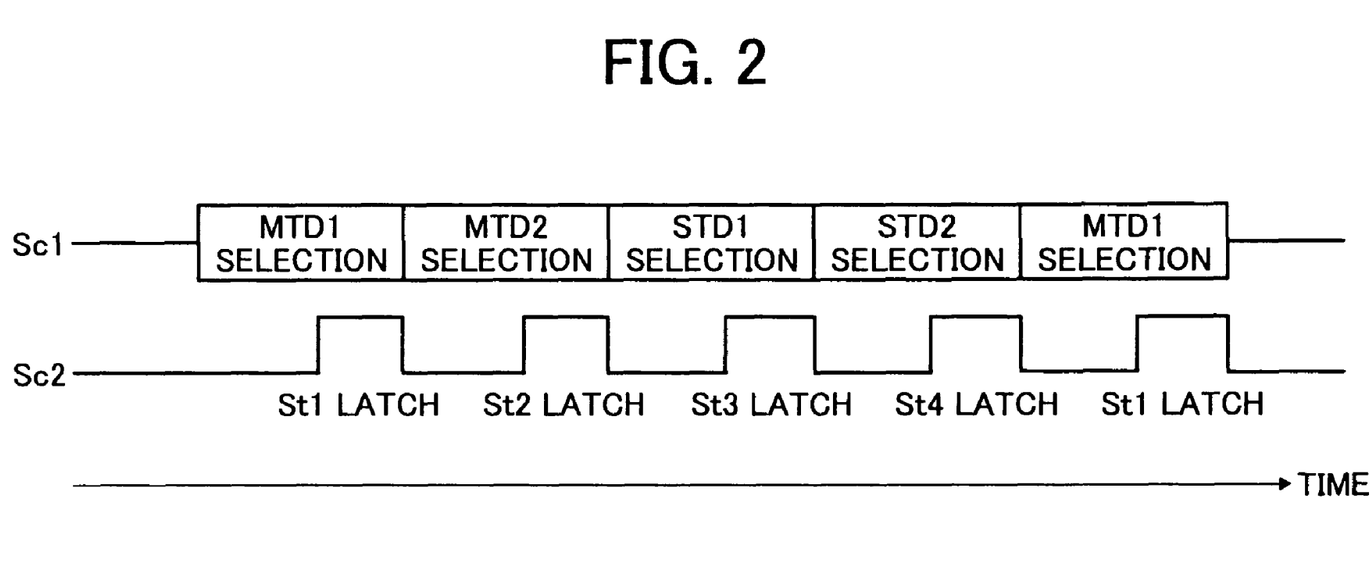
FIG. 2 is an illustration representing operation of a time-shared control circuit.

FIG. 2 is an illustration representing operation of the time-shared control circuit 5. Referring to FIG. 2, the operation of the time-shared control circuit 5 will be described.

The multiplexer 4 continuously receives the voltage signals St1, St2, St3 and St4, which represent temperature values detected by the temperature sensors MTD1, MTD2, STD1 and STD2, respectively. Using the control signal Sc1, the time-shared control circuit 5 switches the voltage signals St1, St2, St3 and St4 sequentially at a predetermined cycle and outputs the voltage signals St1, St2, St3 and St4. In FIG. 2, for example, the time-shared control circuit 5 outputs the voltage signal St1 again after the time-shared control circuit 5 outputs a series of the voltage signals St1, St2, St3 and St4.

If the temperature sensors MTD1, MTD2, STD1 and STD2 have negative temperature characteristics and the voltage of the output signal of the multiplexer 4 is higher than the reference voltage Vref, the comparator 3 outputs high signal level indicating that the temperature detected by the temperature sensor selected by the time-shared control circuit 5 is normal. Further, if the voltage of the output signal is lower than the reference voltage Vref, the comparator 3 outputs low signal level indicating that the temperature detected by the temperature sensor selected by the time-shared control circuit 5 is abnormal.

By contrast, if the temperature sensors MTD1, MTD2, STD1 and STD2 have positive temperature characteristics and the output signal is lower than the reference voltage Vref, the comparator 3 outputs low signal level indicating that the temperature detected by the temperature sensor selected by the time-shared control circuit 5 is normal. Further, if the voltage of the output signal is higher than the reference voltage Vref, the comparator 3 outputs high signal level indicating that the temperature detected by the temperature sensor selected by the time-shared control circuit 5 is abnormal.

Now, a case in which the temperature sensors MTD1, MTD2, STD1 and STD2 have positive temperature characteristics will be explained.

When the time-shared control circuit 5 selects the voltage signal St1 as an output signal of the multiplexer 4, the time-shared control circuit 5 causes the latch circuit LT1 to hold signal level input from the comparator 3 at a latter half portion of the control signal Sc1 using the control signal Sc2. Thus, the time-shared control circuit 5 controls the operations of the multiplexer 4 and the latch circuits LT1 through LT4 using the control signals Sc1 and Sc2.

The time-shared control circuit 5 causes the latch circuit LT1 to hold a voltage comparison result of the voltage signal St1. Similarly, the time-shared control circuit 5 causes the latch circuit LT2 to hold a voltage comparison result of the voltage signal St2, causes the latch circuit LT3 to hold a voltage comparison result of the voltage signal St3, and causes the latch circuit LT4 to hold a voltage comparison result of the voltage signal St4. The latch circuits LT1 through LT4 output the data signals held as detected voltage signals Std1 through Std4, respectively.

Figure 3:
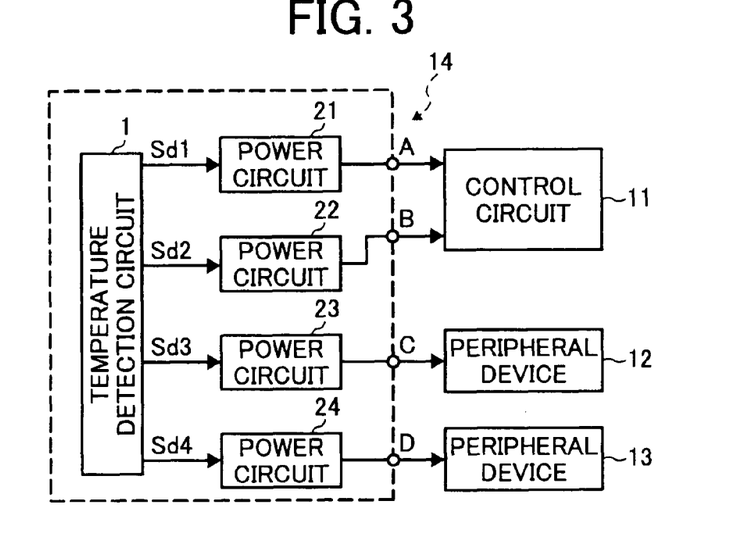
FIG. 3 is an illustration of an electronic device using the temperature detector of FIG. 1.

FIG. 3 is an illustration of an electronic device using the temperature detector of FIG. 1. Referring now to FIG. 3, the electronic device includes a control circuit 11, peripheral devices 12 and 13, and a semiconductor device 14. The control circuit 11 controls the electronic device as a whole and operates at any time during the operation of the electronic device. The peripheral devices 12 and 13 operate only when necessary in accordance with an instruction from the control circuit 11. The semiconductor device 14 supplies power to the control circuit 11 and the peripheral devices 12 and 13.

Figure 4:
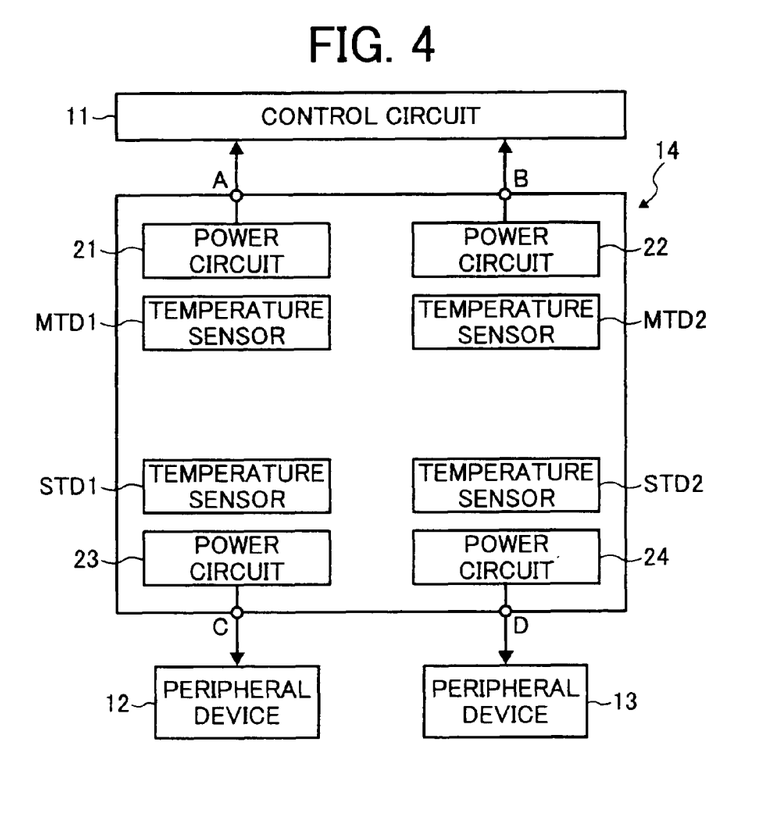
FIG. 4 is an illustration of the electronic device of FIG. 3 representing temperature sensors.

The semiconductor device 14 includes main-power supply circuits 21 and 22, first and second sub-power supply circuits 23 and 24 and a temperature detection circuit 1. The main-power supply circuits 21 and 22 supply power to the control circuit 11. The first sub-power supply circuit 23 supplies power to the peripheral device 12. The second sub-power supply circuit 24 supplies power to the peripheral device 13. The semiconductor device 14 is integrated in an IC (Integrated Circuit) to include terminals A through D. Each one of temperature sensors MTD1, MTD2, STD1 and STD2 is arranged near the power circuits 21 through 24, respectively, of the temperature detection circuit 1 as shown in FIG. 4. FIG. 4 represents a portion of the temperature detector 1 and illustrates the temperature sensors MTD1, MTD2, STD1 and STD2 and the power circuits 21 through 24.

The detection signals Sd1 through Sd4 from the latch circuit LT1 through LT4, respectively, are output so as to correspond to the power circuit 21 through 24, respectively. Each of the power circuits 21 through 24 supplies power in accordance with the detection signal Sd1 through Sd4, respectively.

If the detection signal Sd1 does not indicate a detection of abnormal temperature, the power circuit 21 supplies power to the control circuit 11. If the detection signal Sd1 indicates detection of abnormal temperature, the power circuit 21 stops power supply to the control circuit 11. The power circuits 22 through 24 operate similarly.

In this embodiment, the temperature detection circuit 1 outputs the detection signals Sd1 through Sd4 separately. Then, power supply only to the power circuit corresponding to the detection signal indicating abnormal temperature is stopped.

However, it is possible to make all the output signals indicate abnormal temperature when at least one detection signal indicates abnormal temperature. More specifically, when the detection signals for the main-power supply circuits 21 and 22 indicate abnormal temperature, a detection signal indicating abnormal temperature for all the power circuits 21 and 24 is generated and is output so as to cause all the power circuits 21 and 24 to stop.

Figure 5:
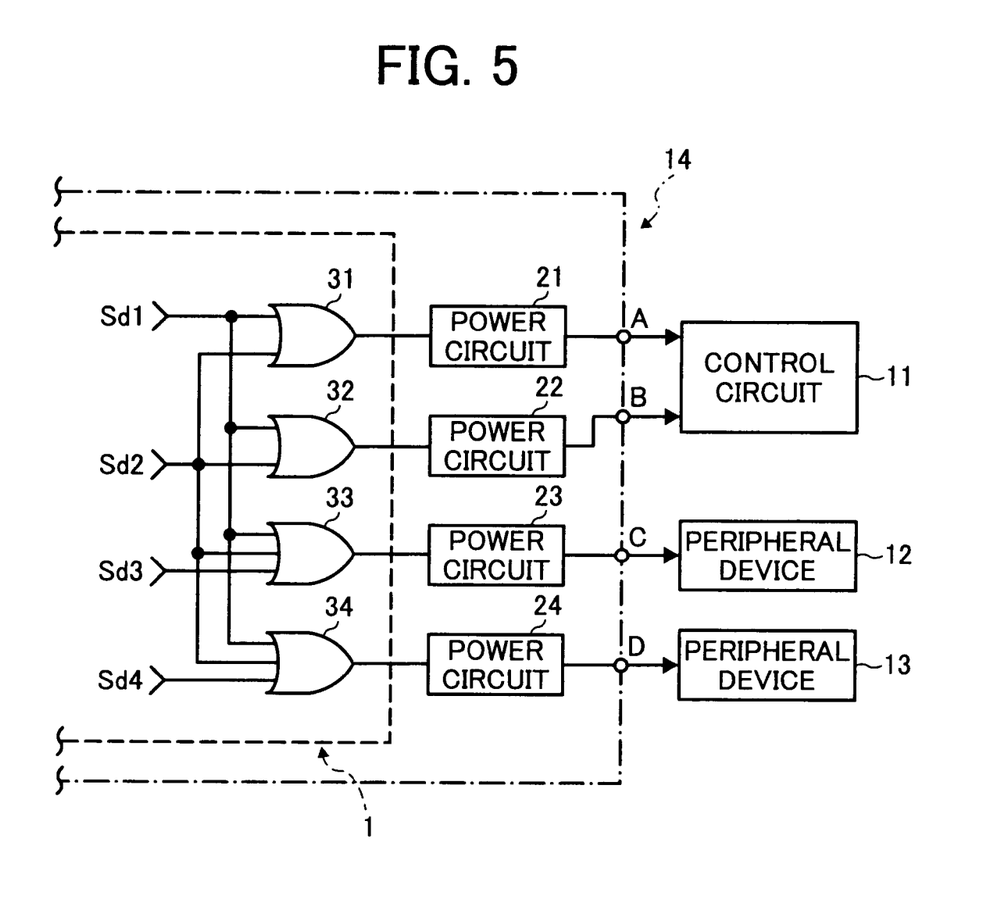
FIGS. 5 through 9 are illustrations of additional exemplary embodiments of temperature detectors.

FIG. 5 illustrates a circuit configuration of the temperature detection circuit 1 for the case described above. In FIG. 5, the identical reference numbers are used as the reference numbers of FIGS. 1 and 3 for the same circuit block, and only that configuration which differs from the circuit shown in FIG. 3 is described.

In the circuit configuration of FIG. 5, OR circuits 31 through 34 are added to the circuit shown in FIG. 3. The temperature detection circuit 1 includes the temperature sensors MTD1, MTD2, STD1 and STD2, the reference voltage generator 2, the comparator 3, the multiplexer 4, the latch circuits LT1 through LT4, and the time-shared control circuit 5 and the OR circuits 31 through 34. The OR circuits 31 and 32 are comprised of two-input OR circuits and the OR circuits 33 and 34 are comprised of three-input OR circuits. The OR circuits 31 through 34 form a signal generation circuit unit.

The detection signal Sd1 is input to the corresponding input terminal of each OR circuit 31 through 34. The detection signal Sd2 is input to the corresponding input terminal of each OR circuit 31 through 34. The detection signal Sd3 is input to the corresponding input terminal of the OR circuit 33. The detection signal Sd4 is input to the corresponding input terminal of the OR circuit 34. The output signals of the OR circuits 31 through 34 are output to the corresponding power circuits 21 through 24, respectively.

By this circuit configuration, all the power circuits 21 through 24 can stop supplying power when abnormal temperature(s) are/is detected in the power circuits 21 and/or 22. Further, the power circuit 23 stops supplying power when abnormal temperature is detected in the power circuits 23, and the power circuit 24 stops supplying power when abnormal temperature is detected in the power circuit 24. When the power circuits 21 and 22 that supply power to the control circuit 11 are overheated, the control circuit 11 may have a problem, and power to the peripheral circuits 12 and 13 also is stopped so as to prevent erroneous operation from spreading to the other circuits because the peripheral circuits 12 and 13 are controlled by the control circuit 11.

Meanwhile, when one of the power circuits 23 and 24 is overheated, only the power circuit that is overheated is stopped. As a result, it is possible to prevent erroneous operation from spreading to another circuit. A function performed by other peripheral circuits than the peripheral circuits 12 and 13 can continue to operate normally because the control circuit 11 is operating normally. Thus, it is possible to minimize damage due to abnormal temperature. If both power circuits 23 and 24 are overheated, both power circuits 23 and 24 are stopped.

In FIGS. 1 and 3, the temperature detection circuit 1 outputs the detection signals Sd1 through Sd4 separately. Only the power circuit corresponding to the detection signal indicating abnormal temperature is stopped. However, if one of the detection signals indicates abnormal temperature, it is possible to make all the output signals to indicate abnormal temperature by setting a resistor.

Figure 6:
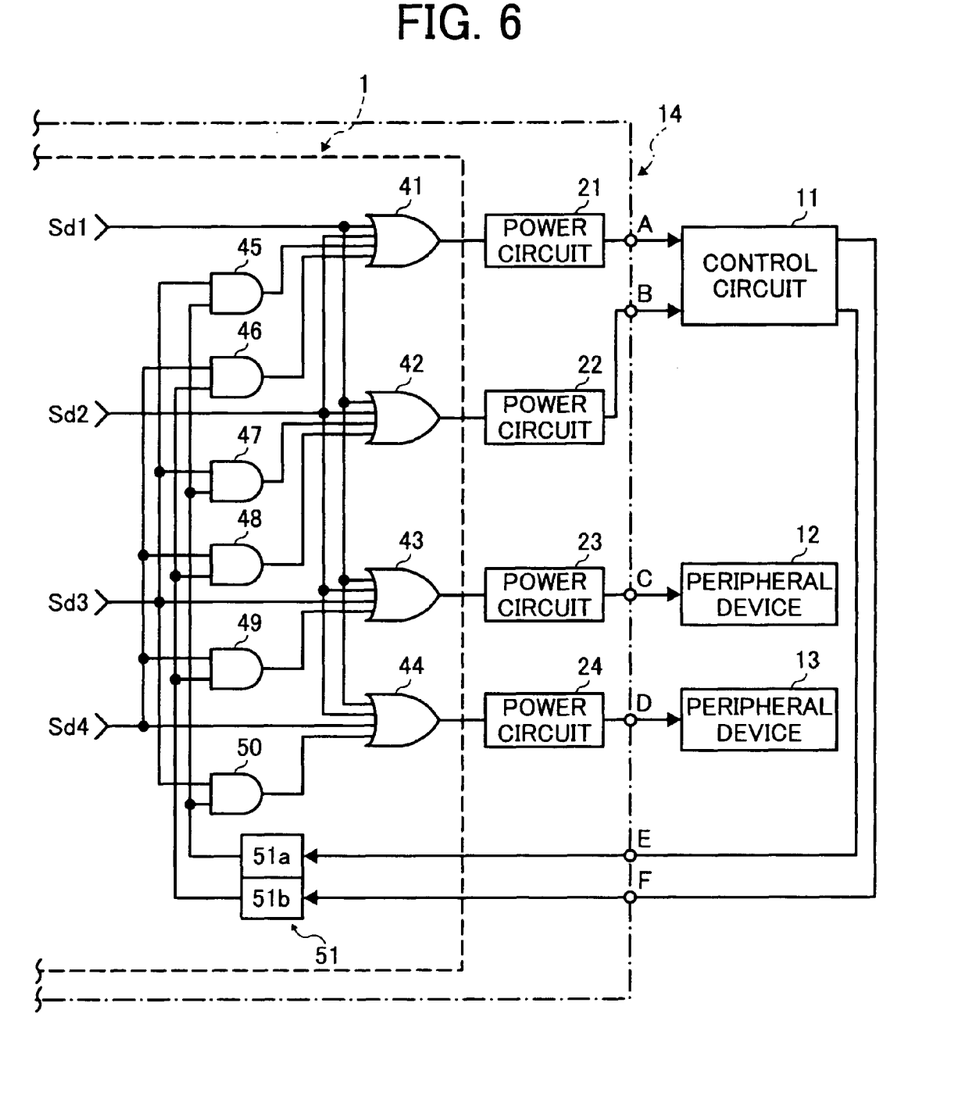

FIG. 6 illustrates a circuit configuration of the temperature detection circuit 1 for the above case. In FIG. 6, the identical reference numbers are used as the reference numbers of FIGS. 1 and 3 for the same circuit blocks, and a description is given only on the different configuration from the circuit configuration of FIG. 3.

In the circuit configuration of FIG. 6, OR circuits 41 through 44, AND circuits 45 through 50 and a resistor 51 are added to the circuit of FIG. 3. The semiconductor device 14 is integrated into an IC to have terminals A through F. The temperature detection circuit 1 includes the temperature sensors MTD1, MTD2, STD1 and STD2, the reference voltage generator 2, the comparator 3, the multiplexer 4, the latch circuits LT1 through LT4, and the time-shared control circuit 5 and the OR circuits 41 through 44, the AND circuits 45 through 50 and the resistor 51. Control data is written to the resistor 51 by the control circuit 11. The OR circuits 41 and 44 are formed of four-input OR circuits and the AND circuits 45 and 50 are formed of two-input AND circuits. The OR circuits 41 through 44, the AND circuits 45 and 50, and the resistor 51 form a signal generation circuit unit.

The detection signal Sd1 is input to the corresponding input terminal of each OR circuit 41 through 44. Similarly, the detection signal Sd2 is input to the corresponding input terminal of each OR circuit 41 through 44. The detection signal Sd3 is input to the corresponding input terminal of the OR circuit 43 and is input to the corresponding input terminal of the AND circuits 45, 47 and 50. The detection signal Sd4 is input to the corresponding input terminal of the OR circuit 44 and is input to the corresponding input terminal of the AND circuits 46, 48 and 49.

Further, the control data written in a bit 51a of the resistor 51 is input to the corresponding input terminal of the AND circuits 45, 47 and 50. The control data signal written in a bit 51b of the resistor 51 is input to the corresponding input terminal of the AND circuits 46, 48 and 49.

Each output terminal of the AND circuit 45 and 46 is connected to the corresponding input terminal of the OR circuit 41. Each output terminal of the AND circuit 47 and 48 is connected to the corresponding input terminal of the OR circuit 42. Further, an output terminal of the AND circuit 49 is connected to the corresponding input terminal of the OR circuit 43. An output terminal of the AND circuit 50 is connected to the corresponding input terminal of the OR circuit 44.

In this circuit configuration, when 0 (low level) is written in the bit 51a of the resistor 51, the AND circuits 45, 47 and 50 close gates of the OR circuits 41, 42 and 44, respectively. When the detection signal Sd3 becomes high level, the OR circuit 43 only outputs high level and causes the power circuit 23 to stop operation. Further, when 1 (high level) is written in the bit 51a of the resistor 51, the AND circuits 45, 47 and 50 open gates of the OR circuits 41, 42 and 44, respectively. As a result, the detection signal Sd3 can pass the AND circuits 45, 47 and 50. When the detection signal Sd3 becomes high level, OR circuits 41 through 44 output high signal level such that the power circuits 21 through 24, respectively, stop operation.

Meanwhile, when 0 (low level) is written in the bit 51b of the resistor 51, the AND circuits 46, 48 and 49 close gates of the OR circuits 41, 42 and 43, respectively. When the detection signal Sd4 becomes high level, the OR circuit 44 only outputs high level and cause the power circuit 24 to stop operation. Further, when 1 (high level) is written in the bit 51b of the resistor 51, the AND circuits 46, 48 and 49 open gates of the OR circuits 41, 42 and 43, respectively. As a result, the detection signal Sd4 can pass the AND circuits 46, 48 and 49. When the detection signal Sd4 becomes high level, OR circuit 41 through 44 output high signal level such that the power circuits 21 through 24 stop the operation.

The detection circuit of FIG. 6 uses two bit resistor as the resistor 51 and controls by switching the detection signals Sd3 and Sd4. However, switching for all the detection signals is possible by increasing the number of bits in the resistor 51. Thus, it is possible to change the relation between the detection signals and operating conditions of the power circuits flexibly by employing the resistor 51, and as a result, providing greater freedom to combine the power circuits of the semiconductor device 14 with a plurality of load circuits. Further, the detection circuit can be made more flexible such that the detection circuit can be used as a general purpose circuit.

Figure 7:
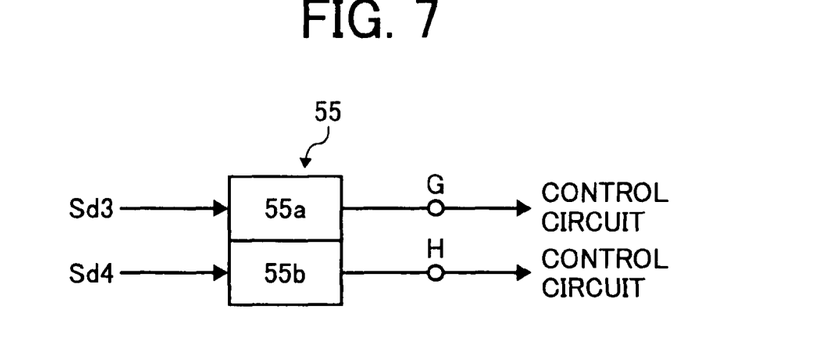

In the circuits of FIGS. 3, 5 and 6, the semiconductor device 14 includes a resistor 55 to store the detection signals Sd3 and Sd4 as shown in FIG. 7. G and H in FIG. 7 represent terminals of the semiconductor device 14. The semiconductor device 14 is integrated in one IC with the resistor 55.

Referring to FIG. 7, the detection signal Sd3 is stored in the bit 55a of the resistor 55 and the detection signal Sd4 is stored in the bit 55b of the resistor 55. The control circuit 11 periodically reads control data stored in the resistor 55 such that the control circuit 11 checks whether the detection signals Sd3 and Sd4 indicate abnormal temperature. If the detection signals Sd3 and Sd4 indicate abnormal temperature, the control circuit 11 can control properly the peripheral devices to which the power circuit incurring the abnormal operation supplies power.

Figure 8:
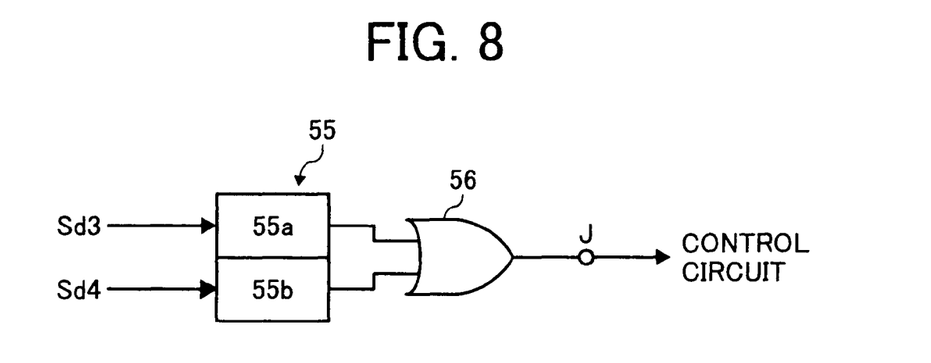

In the circuits of FIGS. 3, 5 and 6, the semiconductor device 14 includes a resistor 55 and an OR circuit 56 as shown in FIG. 8. The resistor 55 stores the detection signals Sd3 and Sd4. The OR circuit 56 generates an information signal reporting that the detection signals Sd3 and Sd4 indicate abnormal temperature. J in FIG. 8 represents a terminal of the semiconductor device 14. The semiconductor device 14 is integrated in one IC with the resistor 55 and the OR circuit 56.

Referring to FIG. 8, the detection signals Sd3 and Sd4 stored in the bits 55a and 55b, respectively, of the resistor 55 are input to the corresponding input terminals of the OR circuit 56. An output terminal of the OR circuit 56 is connected to an interrupt-input terminal IRQ of the control circuit 11. If the detection signals Sd3 and Sd4 become high level by detecting abnormal temperature, the OR circuit 56 outputs high level. As a result, the control circuit 11 recognizes abnormal temperature such that a system control against abnormal temperature can be performed quickly.

Figure 9:
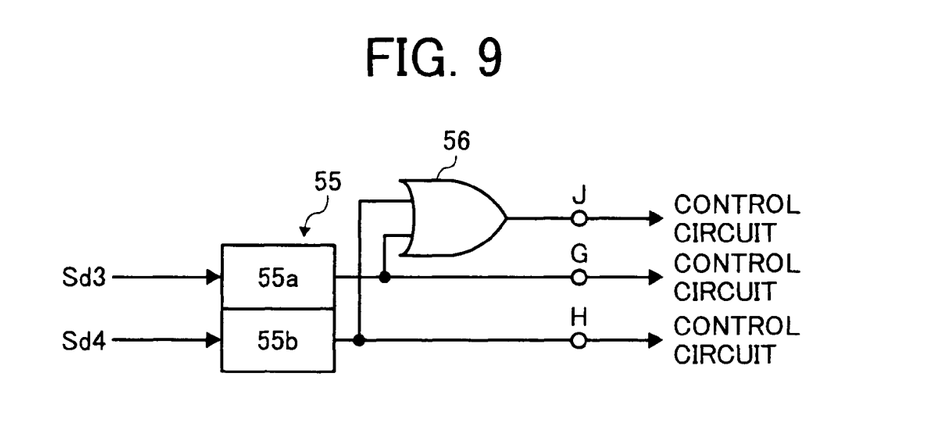

Referring to FIG. 9, in addition to outputting the output signal of the OR circuit 56 to the control circuit 11 as shown in FIG. 8, the detection signals Sd3 and Sd4 stored in the bits 55a and 55b of the resistor 55 are also output to the control circuit 11. The semiconductor device 14 includes J, G and H terminals and is integrated in one IC with the resistor 55 and the OR circuit 56.

When the output signal of the OR circuit 56 becomes high level, the control circuit 11 reads the data stored in the resistor 55 such that the control circuit 11 recognizes which detection signal indicates the detection of abnormal temperature. As a result, a system control can be performed quickly in accordance with the detection signal indicating abnormal temperature.

According to the above described exemplary embodiments, the temperature detection circuit can be achieved with a simple and small circuit by simply adding the multiplexer 4 and the latch circuits LT1 through LT4. Generally, the comparator and reference voltage generator need a relatively large area in the IC chip. However, one comparator and one reference voltage generator are used in the exemplary embodiments of the temperature detection circuit, and as a result, the temperature detection circuit can be achieved with a small chip.

In the above described exemplary embodiments, the temperature detection circuit includes four temperature sensors. However, the teaching of the disclosure is not limited to four temperature sensors, and can employ a larger number of temperature sensors if necessary. When the number of the temperature sensors is increased, the chip size reduction effect is expected to be much larger according to the teaching of the present disclosure. Recently, a large number of ICs employ more than ten temperature sensors. In such ICs, the teaching of the present disclosure significantly contributes to large chip size reduction.

In the above described exemplary embodiments, the temperature detection circuit is provided to the power circuit. However, the teaching of the present disclosure can also be applied to a circuit that performs any function other than the power supply.

Numerous additional modifications and variations are possible in light of the above teachings. It is therefore to be understood that, within the scope of the appended claims, the disclosure of this patent specification may be practiced otherwise than as specifically described herein.

This patent specification is based on Japanese Patent Application, No. 2006-186280 filed on Jul. 6, 2006 in the Japanese Patent Office, the entire contents of which are incorporated by reference herein.

What is claimed is:

1. A temperature detector, comprising:
   a plurality of temperature sensors each configured to generate a voltage signal in accordance with a sensed temperature and output the voltage signal;
   a plurality of storage circuits each corresponding to a respective one of the plurality of temperature sensors, each storage circuit being configured to store a signal level input to the storage circuit in response to a control signal and to output the stored signal level; and
   a control circuit configured to exclusively and sequentially select one of the voltage signals output from the plurality of respective temperature sensors, compare the selected voltage signal with a predetermined reference voltage, and store a comparison result into a corresponding one of the storage circuits, in response to the control signal.

2. The temperature detector of claim 1, wherein the control circuit comprises:
   a reference-voltage generation circuit configured to generate a predetermined reference voltage;
   a selection circuit configured to exclusively select the one of the voltage signals output from one of the plurality of temperature sensors and output the selected voltage signal in response to a select signal;
   a voltage-compare circuit configured to compare the selected voltage signal output from the selection circuit with the predetermined reference voltage and to generate a binary signal indicating a comparison result; and
   a time-shared control circuit configured to cause the selection circuit to exclusively select the one of the voltage signals output from the respective temperature sensors sequentially, and to output the selected voltage signal to the voltage-compare circuit, and to cause a storage circuit corresponding to the temperature sensor from which the selected voltage signal was output to store the binary signal from the voltage-compare circuit sequentially.

3. The temperature detector of claim 1, wherein the control circuit further comprises a signal generator that generates an abnormal-temperature signal and outputs the abnormal-temperature signal, when at least one of the output signal levels from the storage circuits indicates an abnormal temperature detected by the temperature sensor.

4. The temperature detector of claim 1, wherein the control circuit further comprises a signal generator that generates an abnormal-temperature signal and outputs the abnormal-temperature signal, when at least one of temperature sensors specified from outside the temperature detector detects an abnormal temperature.

5. The temperature detector of claim 1, wherein the plurality of temperature sensors, the plurality of storage circuits, and the control circuit are integrated in an IC chip.

6. The temperature detector of claim 3, wherein the plurality of temperature sensors, the plurality of storage circuits, the control circuit and the signal generator are integrated in an IC chip.

7. A semiconductor device, comprising:
a plurality of internal circuits each configured to perform a corresponding predetermined function;
a temperature detector comprising:
   a plurality of temperature sensors corresponding to the respective internal circuits, each temperature sensor being configured to generate a corresponding voltage signal in accordance with a sensed temperature of the corresponding internal circuit and to output the corresponding voltage signal;
   a plurality of storage circuits each corresponding to a respective one of the plurality of temperature sensors, each storage circuit being configured to store a signal level input to the storage circuit in response to a control signal and to output the stored signal level; and
   a control circuit configured to exclusively and sequentially select one of the voltage signals output from the plurality of respective temperature sensors, compare the selected voltage signal with a predetermined reference voltage, and store a comparison result into a corresponding one of the storage circuits, in response to the control signal.

8. The semiconductor device of claim 7, wherein the control circuit comprises:
a reference-voltage generation circuit configured to generate a predetermined reference voltage;
a selection circuit configured to exclusively select the one of the voltage signals output from one of the plurality of temperature sensors and output the selected voltage signal in response to a selection signal;
a voltage-compare circuit configured to compare the selected voltage signal output from the selection circuit with the predetermined reference voltage and generate a binary signal indicating a comparison result; and
a time-shared control circuit configured to cause the selection circuit to exclusively select the one of the voltage signals output from the temperature sensors sequentially, and to output the selected voltage signal from the corresponding temperature sensor to the voltage-compare circuit, and to cause the storage circuit corresponding to the temperature sensor from which the selected voltage signal was output to store the binary signal from the voltage-compare circuit sequentially.

9. The semiconductor device of claim 7, wherein each storage circuit outputs the signal level stored in the storage circuit to the corresponding internal circuit.

10. The semiconductor device of claim 9, wherein each internal circuit stops operation when the corresponding storage circuit outputs an abnormal temperature signal level indicating abnormal temperature to the internal circuit.

11. The semiconductor device of claim 7, wherein the control circuit further comprises a signal generator that checks the signal level output from the plurality of storage circuit circuits and generates an abnormal temperature indication signal indicating that at least one temperature sensor detects an abnormal temperature, and outputs the abnormal temperature indication signal indicating abnormal temperature if at least one temperature sensor detects an abnormal temperature.

12. The semiconductor device of claim 7, wherein the control circuit further comprises a signal generator that checks the signal level output from the plurality of storage circuits and generates an abnormal temperature indication signal indicating that at least one temperature sensor specified from outside the semiconductor device detects abnormal temperature, and outputs the abnormal temperature indication signal indicating abnormal temperature.

13. The semiconductor device of claim 7, wherein each internal circuit stops operation when the internal circuit receives an abnormal temperature signal indicating abnormal temperature from the corresponding storage circuit.

14. The semiconductor device of claim 7, wherein the internal circuits include power supply circuits that supply power to a load.

15. The semiconductor device of claim 7, wherein the internal circuits and the temperature detector are integrated in an IC chip.

16. A method for detecting temperature, comprising:
detecting temperatures at a plurality of locations using a plurality of temperature sensors;
generating for the temperatures detected at the plurality of locations voltage signals in accordance with the temperatures detected at the respective locations;
outputting the voltage signals;
generating a predetermined reference voltage; and
selecting exclusively one of the voltage signals,
comparing the selected voltage signal with the predetermined reference voltage; and
storing a signal level corresponding to comparison result in a storage circuit corresponding to the temperature sensor from which the selected voltage signal was output.

17. The method of claim 16, further comprising generating an abnormal temperature indication signal indicating abnormal temperature and outputting the abnormal temperature indication signal indicating abnormal temperature, when at least one of the voltage signals indicates abnormal temperature detected by at least one of the temperature sensors.

18. The method of claim 16, further comprising generating an abnormal temperature indication signal indicating abnormal temperature and outputting the abnormal temperature indication signal, when at least one temperature sensor detects abnormal temperature.

* * * * *